United States Patent
Hsu et al.

(10) Patent No.: US 10,847,297 B1
(45) Date of Patent: Nov. 24, 2020

(54) LOW-CORE-LOSS TRANSFORMER WITH MAGNETIC PILLAR IN CENTER OF FOUR CORNER PILLARS

(71) Applicant: Hong Kong Applied Science and Technology Research Institute Company, Limited, Hong Kong (HK)

(72) Inventors: Liang Jye Hsu, Hong Kong (HK); Yan Liu, Hong Kong (HK); Shek Mong Wong, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 16/654,154

(22) Filed: Oct. 16, 2019

(51) Int. Cl.
| | |
|---|---|
| H01F 27/00 | (2006.01) |
| H01F 27/245 | (2006.01) |
| H02B 5/02 | (2006.01) |
| H01F 30/12 | (2006.01) |
| H01F 38/00 | (2006.01) |

(52) U.S. Cl.
CPC ......... *H01F 27/006* (2013.01); *H01F 27/245* (2013.01); *H01F 30/12* (2013.01); *H02B 5/02* (2013.01); *H01F 2038/006* (2013.01)

(58) Field of Classification Search
CPC ...... H01F 27/006; H01F 27/245; H01F 30/12; H01F 2038/006; H02B 5/02
See application file for complete search history.

(56) References Cited

U.S. PATENT DOCUMENTS

| | | | | |
|---|---|---|---|---|
| 3,980,858 A | * | 9/1976 | Hibino | ...... H01F 3/04 219/624 |
| 4,665,357 A | * | 5/1987 | Herbert | ...... H01F 19/00 323/345 |

(Continued)

FOREIGN PATENT DOCUMENTS

| | | | |
|---|---|---|---|
| CN | 101552098 A | * | 10/2009 |
| CN | 101552098 A | | 10/2009 |

(Continued)

OTHER PUBLICATIONS

ISR and Written Opinion, PCT/CN2019/113105, dated Jul. 15, 2020.

(Continued)

*Primary Examiner* — Elvin G Enad
*Assistant Examiner* — Malcolm Barnes
(74) *Attorney, Agent, or Firm* — Stuart T. Auvinen g Patent LLC

(57) ABSTRACT

A low-core-loss transformer for high transfer ratio and high power density applications can have five pillars including four corner pillars and at least one center pillar between magnetic metal plates. The center pillar provides an additional flux path to reduce thermal and core losses and improve efficiency. Magnetic flux density may be further reduced by having multiple central pillars in an N-track configuration in several kinds of symmetrical arrangements. The low-core-loss transformer achieves a flexible voltage transfer ratio. The ratio can be either even or odd numbers. An odd ratio design is able to fulfill the requirement of future data centers to supply a 400-volt high-distribution power bus. The transformer windings can be traces on a Printed Circuit Board (PCB) that integrate electronic components for a compact and modular design.

20 Claims, 13 Drawing Sheets

(56) References Cited

U.S. PATENT DOCUMENTS

| | | | | |
|---|---|---|---|---|
| 5,168,440 A | * | 12/1992 | Spreen | H01F 27/2847 |
| | | | | 336/226 |
| 5,414,401 A | * | 5/1995 | Roshen | H01F 3/14 |
| | | | | 336/178 |
| 2009/0243782 A1 | | 10/2009 | Fouquet et al. | |
| 2010/0232181 A1 | * | 9/2010 | Nakahori | H01F 27/2804 |
| | | | | 363/17 |
| 2011/0210617 A1 | * | 9/2011 | Randall | H01F 3/10 |
| | | | | 307/104 |
| 2012/0146753 A1 | * | 6/2012 | Lukso | H01F 27/027 |
| | | | | 336/5 |
| 2014/0252870 A1 | * | 9/2014 | Covic | H02J 50/12 |
| | | | | 307/104 |
| 2017/0330678 A1 | * | 11/2017 | Harrison | H01F 27/2804 |
| 2018/0226182 A1 | * | 8/2018 | Fe | H02M 3/33592 |

FOREIGN PATENT DOCUMENTS

| | | | |
|---|---|---|---|
| CN | 106971829 A | | 7/2017 |
| CN | 207082424 U | | 3/2018 |
| CN | 108777220 A | | 11/2018 |
| JP | 09120910 A | * | 5/1997 |
| JP | H09120910 A | | 5/1997 |

OTHER PUBLICATIONS

Chao Fei, Fred C.Lee, and Qiang Li, "High-Efficiency High-Power-Density LLC Converter with and Integrated Planar Matrix Transformer for High-Output Current Applications", IEEE Transactions on Industrial Electronics, vol. 64, No. 11, 0278-0046, Nov. 2017.

\* cited by examiner

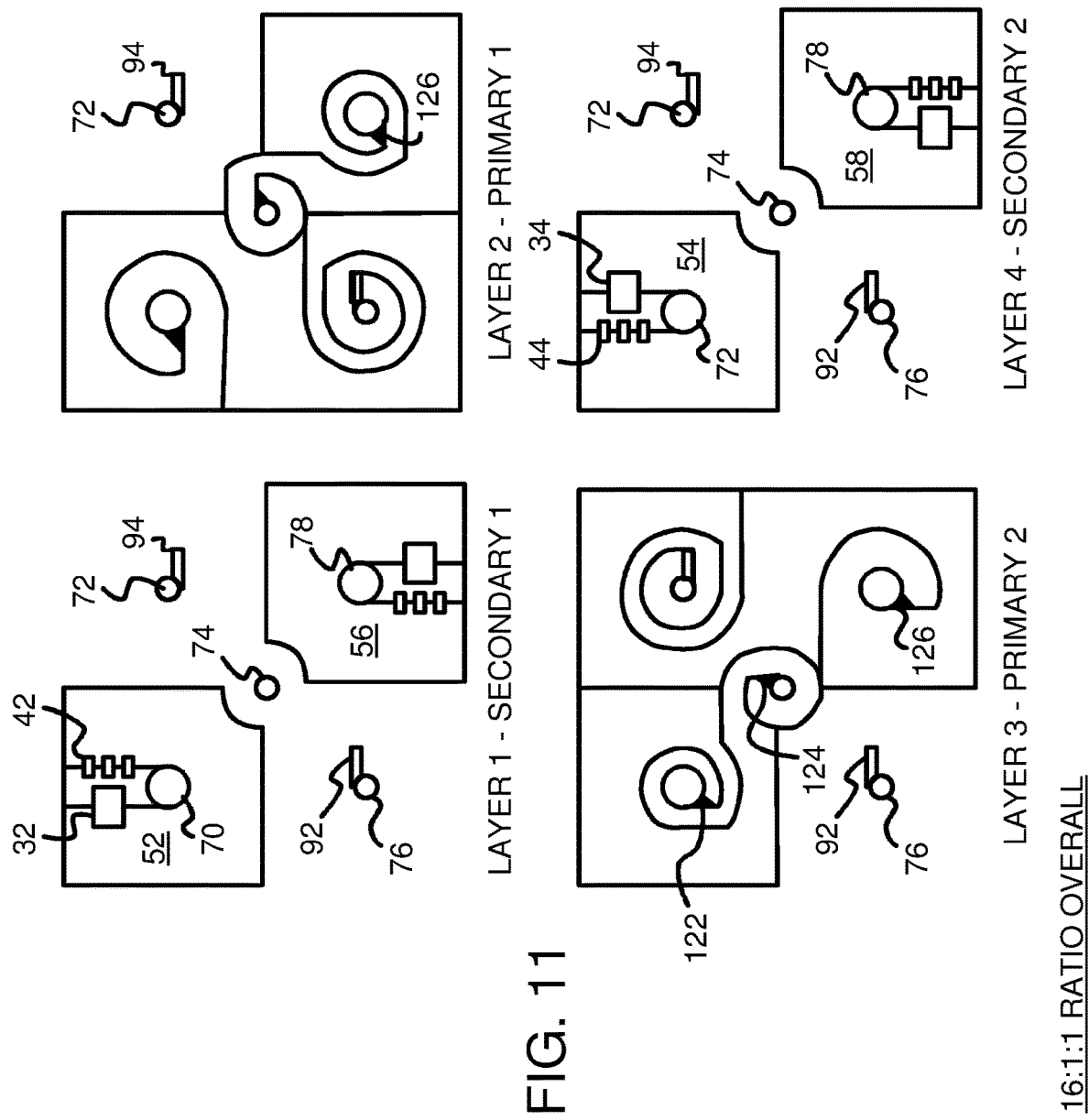

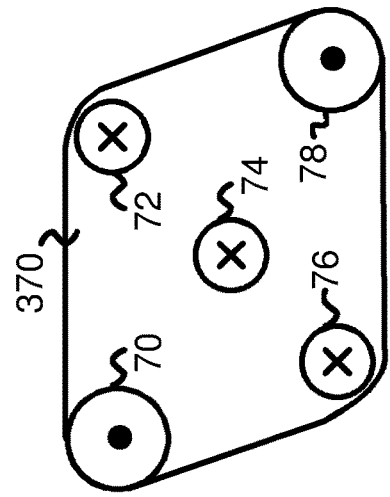
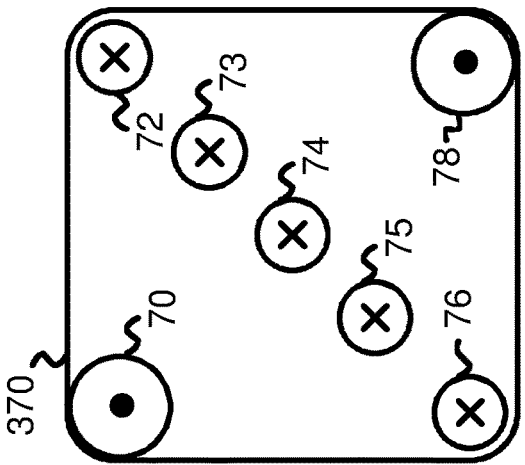
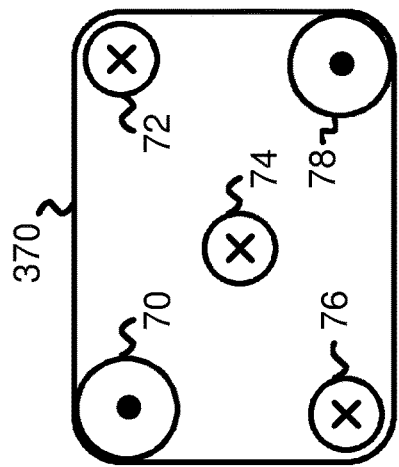
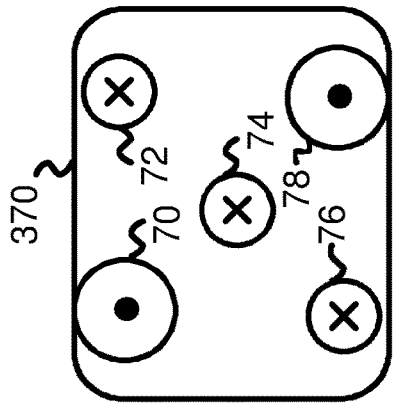
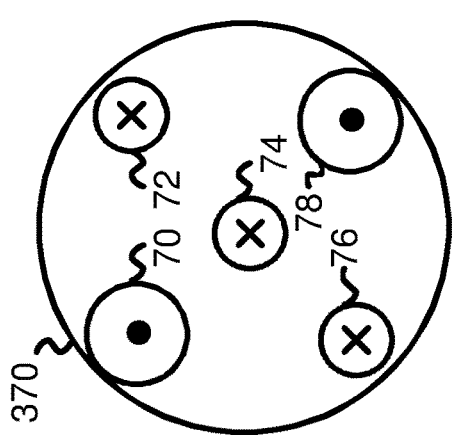
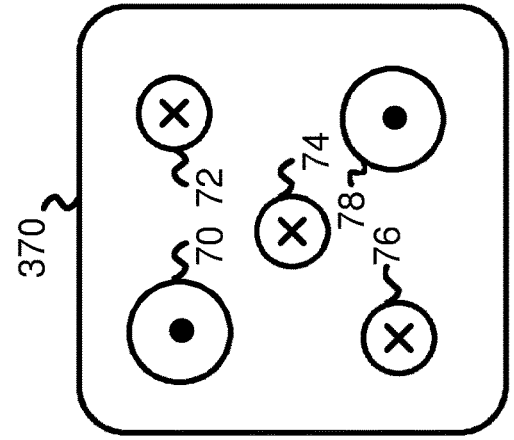

| VOUT=12V, 5-PILLAR TRANSFORMER | | | | | |
|---|---|---|---|---|---|
| VIN (V) | PILLAR # (TURNS) | | | | TOTAL TURNS |
| | 70 : 72 : 74 : 76 : 78 | | | | |
| 360 | 4 : 3 : 1 : 3 : 4 | | | | 15 |
| 384 | 4 : 3 : 2 : 3 : 4 | | | | 16 |
| 408 | 4 : 3 : 3 : 3 : 4 | | | | 17 |
| 432 | 5 : 3 : 2 : 3 : 5 | | | | 18 |
| 456 | 5 : 3 : 3 : 3 : 5 | | | | 19 |
| 480 | 5 : 4 : 2 : 4 : 5 | | | | 20 |

LOW-CORE-LOSS TRANSFORMER WITH MAGNETIC PILLAR IN CENTER OF FOUR CORNER PILLARS

FIELD OF THE INVENTION

This invention relates to transformers with multiple poles, and more particularly to a five-pillar transformer.

BACKGROUND OF THE INVENTION

Transformers are often used in power converters for electrical isolation and voltage conversion. The ratio of turns of the primary winding to turns of the secondary winding determines the voltage ratio between the primary and secondary sides of the transformer.

FIG. 1 shows a prior-art power architecture for a data center. Three-phase 480-volt Alternating Current (AC) power is stepped down from AC utility grid 330 through high voltage transformer (XFMR) 331 to power Uninterruptible-Power-Supply (UPS) 340 that charges battery 310 through AC/DC stage 342. DC/AC stage 344 inverts battery power or directly delivers AC power to Power Distribution Unit (PDU) 326 that carries single-phase 110-volt or 220-volt AC within the data center. Power Supply Unit (PSU) 320 uses AC/DC rectifier 322 to generate a 400-volt DC high voltage that is stepped down to 12-volt by DC/DC converter 324 to drive power bus 346. The 12-volt DC on power bus 346 is distributed to several server-boards 310 that have voltage regulators 312, 314, 316 to regulate their output voltages to CPU 302, chip set 304, and memory 306.

However, there are too many stages between the utility grid and the end units which can reduce efficiency. Also, a high conduction loss would occur on 12-volt power bus 346. Therefore a higher-voltage power bus is proposed in FIG. 2. FIG. 2 shows a data center power architecture using a 400-volt bus. UPS 340 is modified to drive 400-volt DC onto power bus 348. Since a 400-volt power supply is distributed to many server-boards 311 over power bus 348, not only is the power conduction losses on power bus 348 reduced for long-distance power transmission, but also the total efficiency is increased due to eliminating two stages 322, 344 when compared with prior-art data center power architecture of FIG. 1. In addition, costs are reduced with the 400-volt power bus application. Each server-board 311 has DC/DC converter 325 to step down the 400-volt supplied from power bus 348 to a local 12-volt supply to voltage regulators 312, 314, 316 and then to each control unit 302, 304, 306 on server-board 311.

One challenge to this new power architecture is to place DC/DC converter 325 on server-board 311 within space constraints. Normally a transformer applied to a common isolated converter would be very large when converting 400-volt to 12-volt. Besides, except for the primary-side switching transistors and secondary-side rectifiers, one component dominating the efficiency of DC/DC converter 325 is the internal transformer. Traditional magnetic core shapes such as PQ core or RM core have the drawbacks of large core loss, large termination loss, and large core volume.

In order to solve the issues of a traditional transformer, a matrix transformer is proposed, which divides the traditional transformer into multiple small elements through a specialized winding method of connecting each element in series for primary-side winding and in parallel for secondary-side winding. For instance, the step-down conversion from 400-volt to 12-volt in a general Half-Bridge (HB) converter has about 16.7 turns in its transformer. If the winding arrangement of a matrix transformer is designed for about 2.1 turns for the primary winding and 1 turn for the secondary winding in one element, then there would be eight elemental transformers linked together, whereas four elemental transformers are needed for 4.2 turns within one elemental primary winding. Even though the overall volume for either four cores or eight cores is lower than the whole traditional transformer, the core losses are much increased in multiple cores usage.

Another matrix transformer integrates multiple cores into one core. The core losses are reduced by replacing multiple elemental transformers with multiple pillars in one core. However, a turn ratio limitation problem can occur. The flux balance principle may limit the primary windings ratios to be even numbers, not odd numbers in this matrix transformer. When the primary windings are driven by a 400-volt bus, having an even turn ratio would force the reflected voltage on the secondary side to be above or below 12-volt by an undesirable amount. Alternatively, the 400-volt bus may be forced to operate at other voltages, such as 384-volt or 432-volt, for 16:1 and 18:1 turn ratios. Thus these matrix transformers are not ideal for the proposed data center power architecture where 400-volt on the power bus is converted to 12-volt locally.

What is desired is a multi-element transformer that supports odd turn ratios. A multi-element transformer with an integrated core that is compact and modular is also desirable. A multi-element transformer with an optimized core geometry and that minimizes core losses is desired.

BRIEF DESCRIPTION OF THE DRAWINGS

FIG. 11 is a modification to the metal traces to achieve an even turn ratio.

FIGS. 12A-12F show alternatives for the arrangement of the five pillars in the transformer.

DETAILED DESCRIPTION

The present invention relates to an improvement in multi-core transformers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
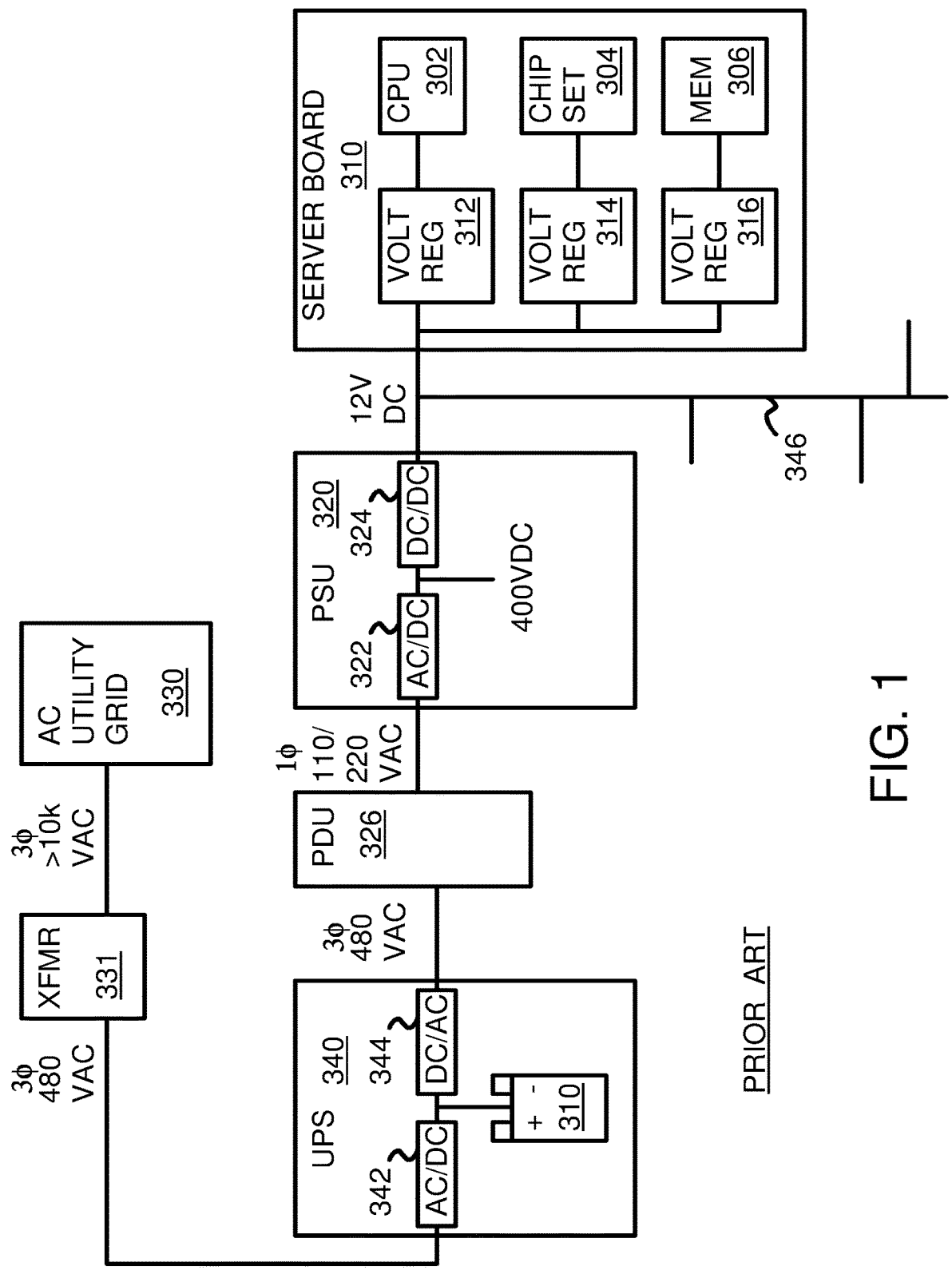
FIG. 1 shows a prior-art power architecture for a data center.
Figure 2:
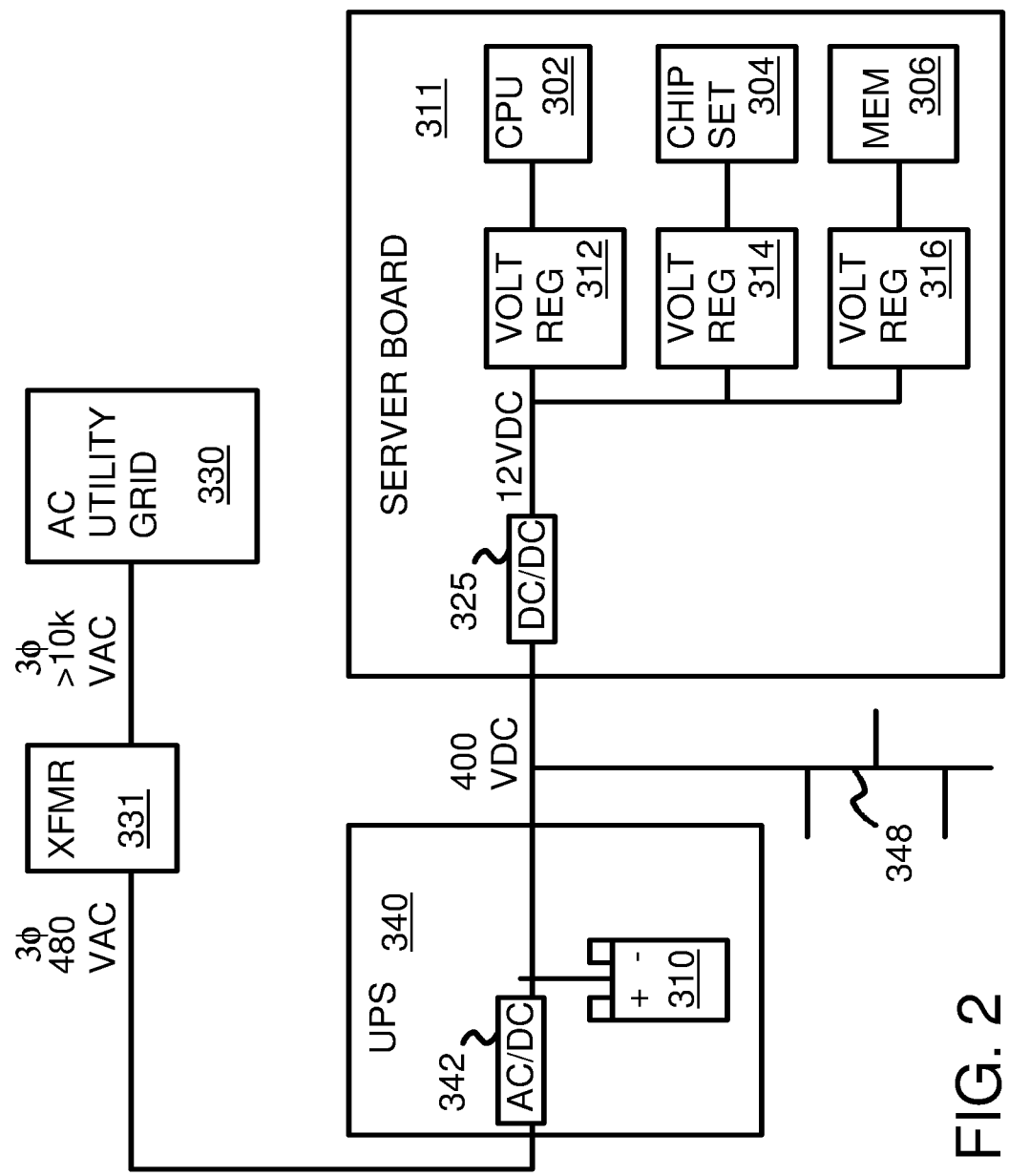
FIG. 2 shows a data center power architecture using a 400-volt bus.
Figure 3:
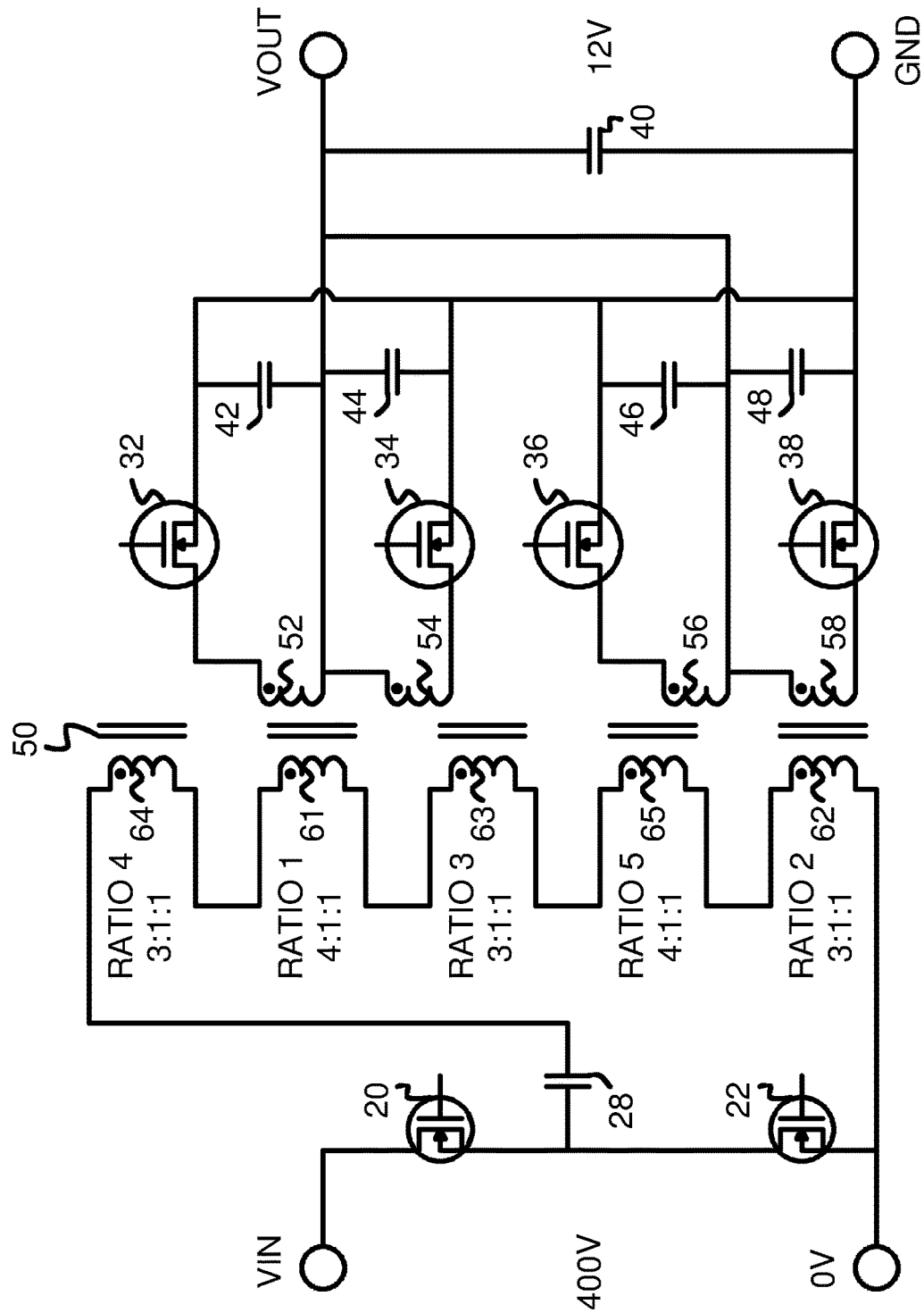
FIG. 3 is a schematic of a power converter using a low-core-loss five-pillar transformer.

FIG. 3 is a schematic of a power converter using a low-core-loss five-pillar transformer. Power converter 100 is a two-inductor and one-capacitor LLC resonant converter with half-bridge transistors on the primary side and synchronous rectifiers on the secondary side. Power converter 100 is suitable for use as DC/DC converter 325 (FIG. 2).

An input voltage, such as 400 volts, is applied across transistors 20, 22, which both connect to an internal bridge node that is coupled to transformer 50 through capacitor 28. Transistors 20, 22 can be high-performance power transistors, Gallium-Nitride (GaN) transistors, or general-purpose MOS transistors. The gates of transistors 20, 22 are driven by switched control signals to implement a Switched-Mode Power Supply (SMPS).

Transformer 50 has 5 magnetic core pillars that are sandwiched between two magnetic metal plates. The primary windings are wrapped around all five pillars in a series. Capacitor 28 connects the switching node of transistors 20, 22 to the primary windings. During a half cycle of one switching period, the primary-side current first passes through primary windings 64 on pillar 4 (ratio 4), then through primary windings 61 that are wrapped around pillar 1 (ratio 1), then through primary windings 63 that are wrapped around pillar 3 (ratio 3), then through primary windings 65 that are wrapped around pillar 5 (ratio 5), and finally through primary windings 62 that are wrapped around pillar 2 (ratio 2) to connect to the primary-side ground. During the next half cycle, the primary-side current flows in reverse. The primary-side current first passes through primary winding 62, then through windings 65, 63, 61 in that order, and finally through primary windings 64 to connect to capacitor 28.

The secondary side has four secondary windings that are arranged in parallel, as two pairs or sets of secondary windings. Each secondary winding pair is wrapped around only one of the five pillars. Secondary windings 52, 54 are wrapped around pillar 1, while secondary windings 56, 58 are wrapped around pillar 5. These two pillars 1, 5 have the same flux direction for emitting or receiving magnetic flux to the other three central pillars. The flux direction would reverse twice a switching cycle and depend on the primary-side current direction.

Secondary winding 52 is connected between the drain terminal of transistor 32 and VOUT, while secondary winding 54 is connected between VOUT and the drain terminal of transistor 34. Capacitor 42 connects the source terminal of transistor 32 to the secondary ground, while capacitor 44 connects the source terminal of transistor 34 to the secondary ground.

Similarly, secondary winding 56 is connected between the drain terminal of transistor 36 and VOUT, while secondary winding 58 is connected between VOUT and the drain terminal of transistor 38. Capacitor 46 connects the source terminal of transistor 36 to the secondary ground, while capacitor 48 connects the source terminal of transistor 38 to the secondary ground.

Transistors 32, 34, 36, 38 have their gates driven by Synchronous Rectification (SR) signals to rectify the current induced onto secondary windings 52, 54, 56, 58 by transformer 50 to generate the 12-volt output voltage VOUT on output capacitor 40. Transistors 32, 34, 36, 38 can be power transistors such as n-channel MOS transistors.

Figure 4:
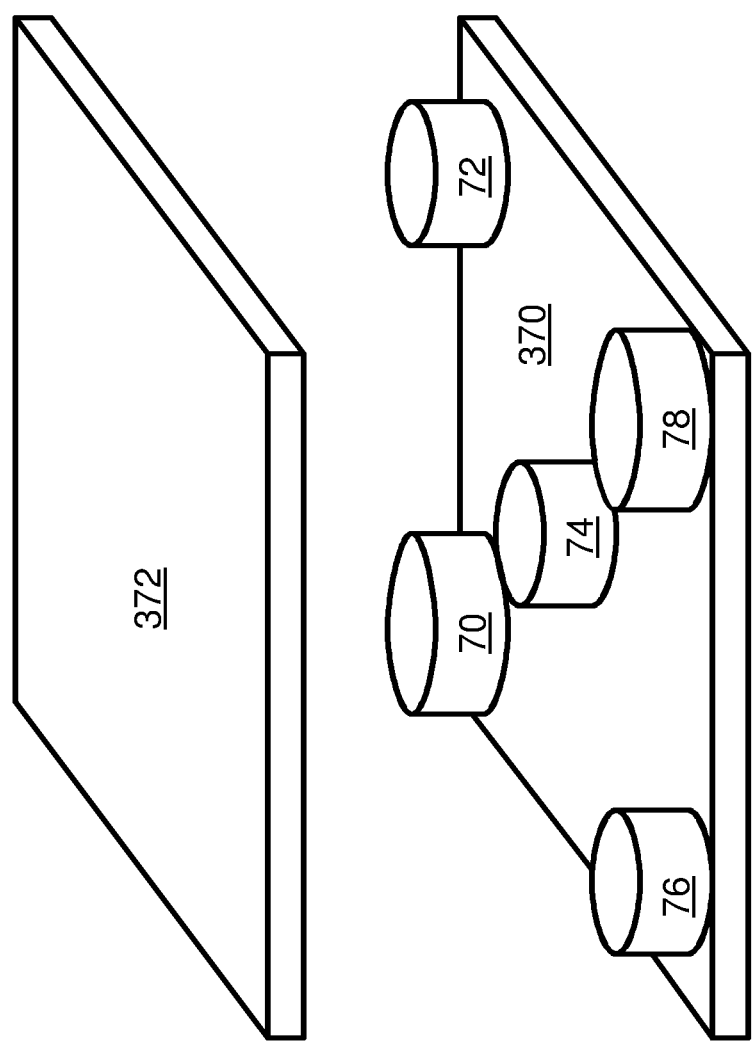
FIG. 4 is a diagram of the low-core-loss five-pillar transformer.

FIG. 4 is a diagram of the low-core-loss five-pillar transformer. Five pillars 70, 72, 74, 76, 78 are made of magnetic material and are sandwiched between magnetic metal plates 370, 372. Central pillar 74 is placed in the middle of the square formed by corner pillars 70, 72, 76, 78.

Figure 5:
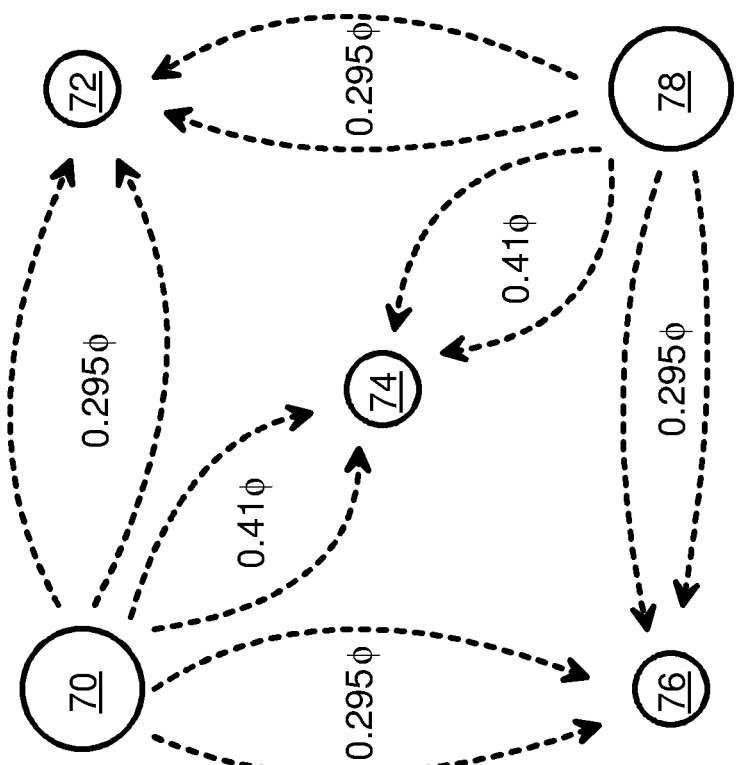
FIG. 5 is a diagram of magnetic flux flow in the low-core-loss five-pillar transformer.

FIG. 5 is a diagram of magnetic flux flow in the low-core-loss five-pillar transformer. Pillars 70, 78 are flux-emitting pillars while pillars 72, 74, 76 are flux-receiving pillars. For example, the north magnetic poles for emitting magnetic flux could be considered to be located at the top of pillars 70, 78, while the south magnetic poles for receiving magnetic flux could be considered to be located at the top of pillars 72, 74, 76. Furthermore, the flux flow direction would reverse at the next half of the switching cycle as pillars 70, 78 becoming flux-receiving pillars while pillars 72, 74, 76 becoming flux-emitting pillars.

For one half switching cycle, the magnetic flux lines are emitted from upper-left and lower-right pillars 70, 78, and flow through upper magnetic plate 372, then into pillars 72, 74, 76 and complete the loop through lower magnetic plate 370. Based on the arrangement for the five pillars, there are six magnetic loops inside the core. The magnetic flux emitted from upper-left pillar 70 is divided into three paths through upper and lower magnetic metal plates 370, 372 to three adjacent pillars 72, 74, 76, while the magnetic flux emitted from lower-right pillar 78 is divided into three other paths through upper and lower magnetic metal plates 370, 372 to three adjacent pillars 72, 74, 76.

When pillars 70, 72, 76, 78 are arranged in a square, and central pillar 74 is located in the center of the square, then the flux density to center pillar 74 is greater than to corner pillars 72, 76, since center pillar 74 is closer to emitting pillars 70, 78 than corner pillars 72, 76. The calculated flux to center pillar 74 is 0.41 $\phi$, while the flux to either corner pillar 72, 76 is 0.295 $\phi$.

Figure 6:
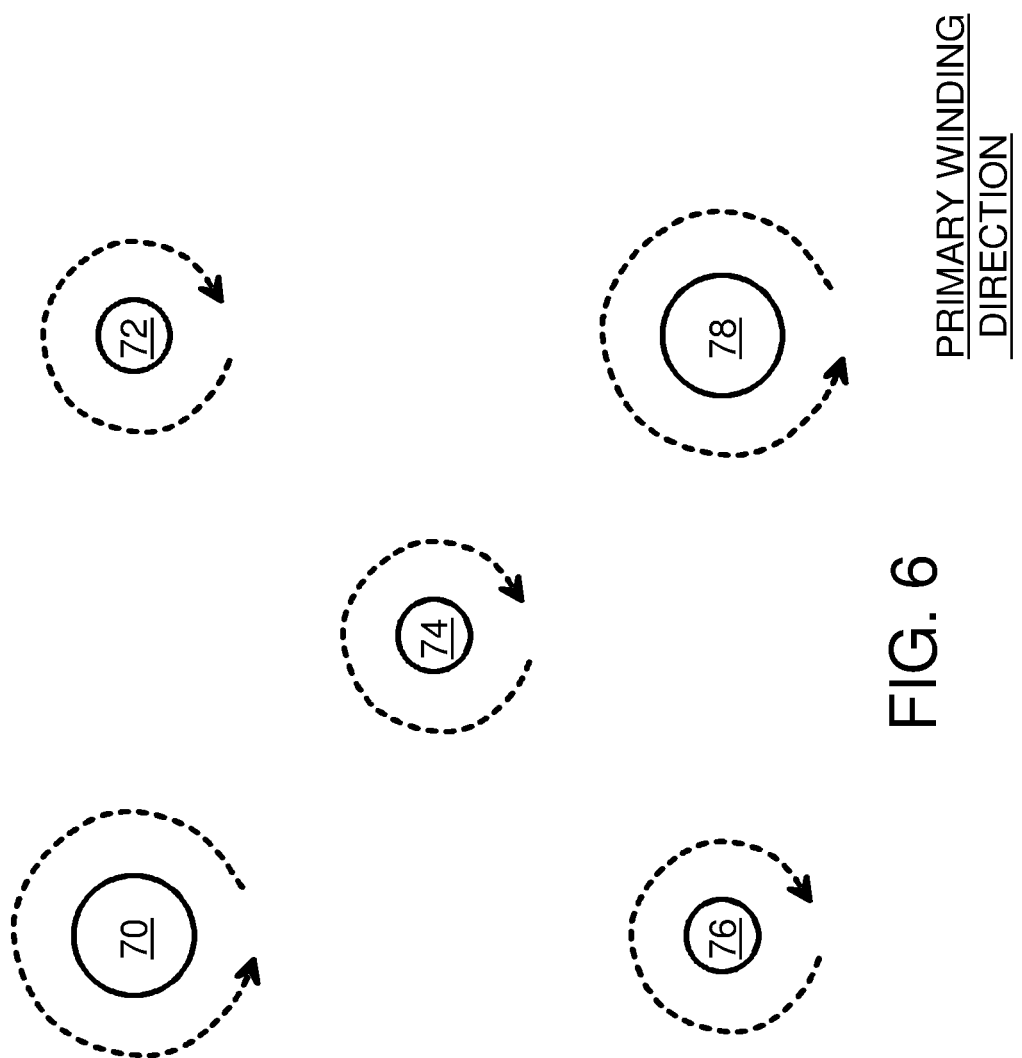
FIG. 6 shows primary winding directions for the low-core-loss five-pillar transformer.

FIG. 6 shows primary winding directions for the low-core-loss five-pillar transformer. The primary windings are wound around flux-receiving pillars 72, 74, 76 in a clockwise direction, but are wound around flux-emitting pillars 70, 78 in a counter-clockwise direction. According to the right-hand grip rule, when the magnetic flux is created by primary current flowing in a counter-clockwise direction in pillars 70, 78, then this magnetic flux flows upward toward upper magnetic metal plate 372. Also according to this right-hand grip rule, when the magnetic flux is created by primary current flowing in a clockwise direction in pillars 72, 74, 76, then the magnetic flux flows downward toward lower magnetic metal plate 370.

Figure 7:
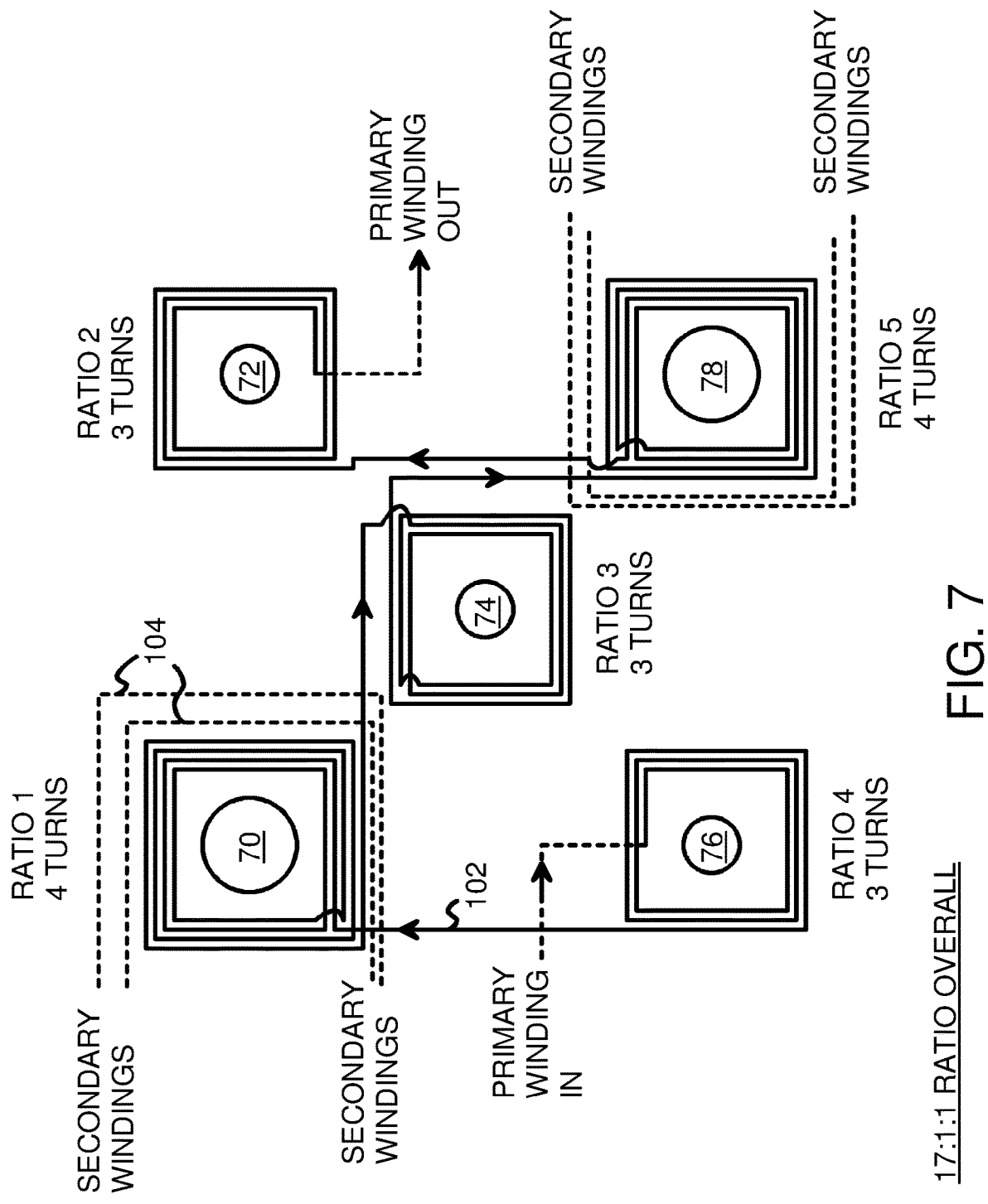
FIG. 7 is a diagram highlighting primary and secondary windings around the five pillars to produce a 17:1:1 ratio.

FIG. 7 is a diagram highlighting primary and secondary windings around the five pillars to produce a 17:1:1 ratio. While the windings could be metal wires wrapped around the pillars, in this embodiment the windings are metal traces on a printed-circuit board (PCB) that is inserted between upper magnetic metal plate 372 and lower magnetic plate 370, with five holes for the five pillars 70-78. In one embodiment, a four-layer PCB is used that has four metal layers. Two layers are used for the secondary windings, and two layers are used for the primary windings. Secondary windings 104 are formed on two PCB layers around pillar 70, while another pair of secondary windings are formed on these two PCB layers around pillar 78. Secondary current is produced in secondary windings 104 by a continually varying flux inside the shared pillars wrapped with primary winding 102. The value for the induced secondary current is the product of the transformer turn ratio and the primary current.

Primary winding 102 is wrapped around all five pillars. Since two PCB layers are used for primary winding 102, the metal traces for primary winding 102 can cross-over itself using vias among the two layers. Primary winding 102 wraps around flux-receiving pillars 72, 74, 76 in a clockwise direction, while wrapping around flux-emitting pillars 70, 78 in a counter-clockwise direction.

Primary winding 102 first wraps around lower-left pillar 76 three times, then around upper-left pillar 70 four times, then around central pillar 74 three times, then around lower-right pillar 78 four times, and finally around upper-right pillar 72 three times. The total number of turns of primary winding 102 around all pillars is 3+4+3+4+3 or 17, while the secondary has four separate one-wrap loops around pillars 70, 78. The overall turn ratio of primary winding to two pairs of secondary windings is 17:1:1, which equates to a 408-volt input voltage for the required 12-volt output voltage in the half-bridge LLC circuit of FIG. 3. This is the closest conversion ratio for meeting the desirable 400 volts on power bus 348 (FIG. 2).

Individually, pillar 76 has three turns of primary winding 64 (FIG. 3). The primary coil on pillar 76 receives flux that induces a portion of the positive secondary current on secondary windings 54, 58 on pillars 70, 78 when high-side transistor 20 (FIG. 3) is on and the primary current flows out from capacitor 28. The primary coil on pillar 76 emits flux that induces a portion of the negative secondary current on secondary windings 52, 56 on pillars 70, 78 when low-side transistor 22 (FIG. 3) is on and primary current flows in from capacitor 28. Individually, pillar 76 has a 3:1:1 turn ratio (ratio 4) of primary windings to two pairs of secondary windings.

Also looking individually at pillar 70, pillar 70 has four turns of primary winding 61. The primary coil on pillar 70 emits flux that induces a portion of the positive secondary current on secondary windings 54, 58, on pillars 70, 78 when high-side transistor 20 is on and the primary current flows out from capacitor 28, whereas it receives flux that induces a portion of the negative secondary current on secondary windings 52, 56 on pillars 70, 78 when high-side transistor 20 is off and low-side transistor 22 is on and primary current flows in from capacitor 28. Individually, pillar 70 has a 4:1:1 turn ratio (ratio 1) of primary windings to two pairs of secondary windings.

Individually, center pillar 74 has three turns of primary winding 63. The primary coil on pillar 74 receives flux that induces a portion of the positive secondary current on secondary windings 54, 58 on pillars 70, 78 when high-side transistor 20 is on and the primary current flows out from capacitor 28. The primary coil on pillar 74 emits flux that induces a portion of the negative secondary current on secondary windings 52, 56 on pillars 70, 78 when low-side transistor 22 is on and primary current flows in from capacitor 28. Individually, pillar 74 has a 3:1:1 turn ratio (ratio 3) of primary windings to two pairs of secondary windings.

Also looking individually at pillar 78, pillar 78 has four turns of primary winding 65. The primary coil on pillar 78 emits flux that induces a portion of the positive secondary current on secondary windings 54, 58, on pillars 70, 78 when high-side transistor 20 is on and the primary current flows out from capacitor 28, whereas it receives flux that induces a portion of the negative secondary current on secondary windings 52, 56 on pillars 70, 78 when high-side transistor 20 is off and low-side transistor 22 is on and primary current flows in from capacitor 28. Individually, pillar 78 has a 4:1:1 turn ratio (ratio 5) of primary windings to two pairs of secondary windings.

Finally, looking individually at upper-right pillar 72, pillar 72 has three turns of primary winding 62. The primary coil on pillar 72 receives flux that induces a portion of the positive secondary current on secondary windings 54, 58 on pillars 70, 78 when high-side transistor 20 is on and the primary current flows out from capacitor 28. The primary coil on pillar 72 emits flux that induces a portion of the negative secondary current on secondary windings 52, 56 on pillars 70, 78 when low-side transistor 22 is on and primary current flows in from capacitor 28. Individually, pillar 72 has a 3:1:1 turn ratio (ratio 2) of primary windings to two pairs of secondary windings.

Figure 8:
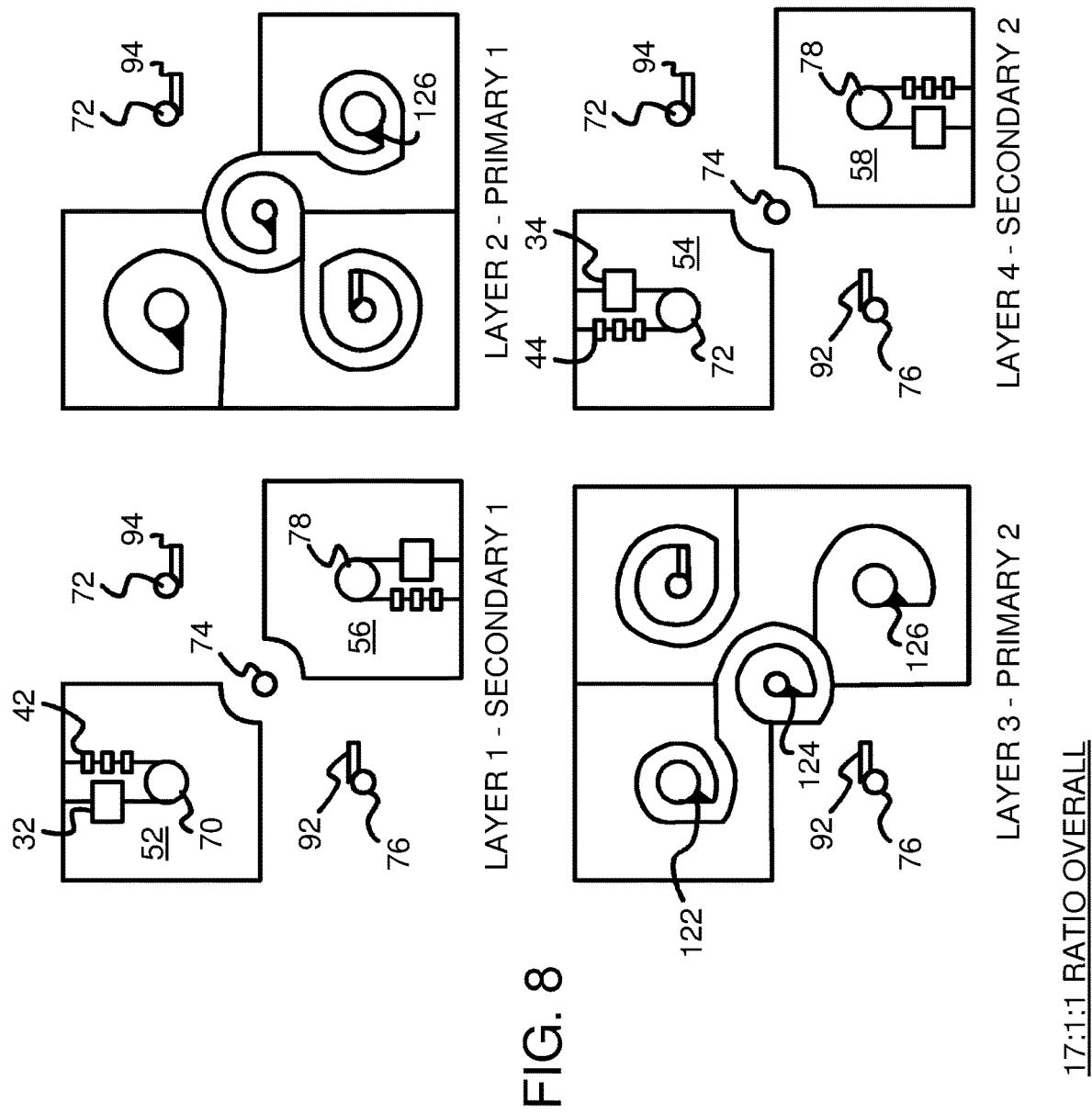
FIG. 8 is a diagram of wiring traces formed on four PCB metal layers to implement a 17:1:1 transformer with five pillars.

FIG. 8 is a diagram of wiring traces formed on four metal layers to implement a 17:1:1 transformer with five pillars. The four layers of metal on the four-layer PCB are patterned using the patterns shown in FIG. 8. Primary winding 102 (FIG. 7) is formed on layers 2 and 3 while two secondary windings are formed on layer 1 and two more secondary windings are formed on layer 4. The black lines are gaps in the metal while the enclosed white spaces are wide metal lines that allow for high conductance due to their large area. Smaller, more narrow metal traces could be substituted, but the narrow width would increase resistance losses.

On layer 1, one turn around upper-left pillar 70 is formed by the metal rectangle surrounding pillar 70. This rectangle is broken by two gaps that extend from the top of the rectangle to pillar 70, breaking the full loop. One gap is straddled by transistor 32, while the other gap is straddled by capacitors 42. The node between the gaps is the secondary ground node GND in FIG. 3. VOUT is connected to the upper-right of the rectangle, to the right of capacitors 42. Secondary winding 52 is formed by this upper-left rectangle.

Also on layer 1, one turn around lower-right pillar 78 is formed by the metal rectangle surrounding pillar 78. This rectangle is broken by two gaps that extend from the bottom of the rectangle to pillar 78, breaking the full loop. One gap is straddled by transistor 36, while the other gap is straddled by capacitors 46. The node between the gaps is the secondary ground node GND. VOUT is connected to the lower-left of the rectangle, to the left of capacitors 46. Secondary winding 56 is formed by this lower-right rectangle.

Similarly, two secondary windings 54, 58 are formed by the upper-left and lower-right rectangles, respectively, of layer 4. VOUT is connected to capacitors 44, 48 of the single-turn loops. The layer 1 and layer 4 rectangles have a circular cutout around central pillar 74.

Terminals 92, 94 are formed to fit through the four metal layers. Terminal 92 is located near lower-left pillar 76 and receives the input to primary winding 102, such as from capacitor 28 of FIG. 3. Terminal 94 is located near upper-right pillar 72 and carries the output from primary winding 102, such as the primary ground in FIG. 3.

Input terminal 92 is not connected to any metal traces on layers 1, 3, 4, but connects to the center of a spiral metal trace on layer 2. The black lines on the drawing represent the gaps between metal, not the metal traces themselves. This trace spirals in a clockwise direction around pillar 76 for three turns on layer 2. The last turn has a rectangular outer edges and passes from the lower-left area around pillar 76 to the upper-left and then spirals around upper-left pillar 70. One-and-a-half turns around pillar 70 are formed on layer 2, in a counter-clockwise direction around pillar 70.

Vias 122, 124, 126 are formed to electrically connect layers 2 and 3. Vias 122, 124, 126 are formed near pillars 70, 74, 78, respectively. After one-and-a-half turns around upper-left pillar 70 on layer 2, the primary winding passes through via 122 near pillar 70 to layer 3. From via 122, the metal trace spirals outward in a counter-clockwise direction around pillar 70 for more than two turns, for a total of four turns around pillar 70 within layers 2 and 3.

Then the metal trace spirals clockwise inward for one-and-a-half turns around center pillar 74 on layer 3, then through via 124 to layer 2, and spirals clockwise outward for one-and-a-half more turns around center pillar 74, for a total of three turns around central pillar 74. After completing the three turns around center pillar 74, the metal trace spirals inward in a counter-clockwise direction around lower-right pillar 78 for more than two turns, and then passes from layer 2 to layer 3 through via 126, and on layer 3 spirals outward in a counter-clockwise direction around lower-right pillar 78 for nearly one-and-a-half turns, for a total of four turns around pillar 78 within layers 2 and 3.

On layer 3, the metal trace continues from spiraling outward around pillar 78 to spiraling inward around upper-right pillar 72 in a clockwise direction for three turns. Then at pillar 72 the metal trace ends at terminal 94 and is output as the primary ground in FIG. 3.

Primary winding 102 has a total of four turns around each of pillars 70, 78, and three turns around each of pillars 72, 74, 76, for a total of 17 turns. Since the secondary windings are for one turn each, a turn ratio of 17:1:1 is achieved using the metal PCB traces of FIG. 8.

Figure 9:
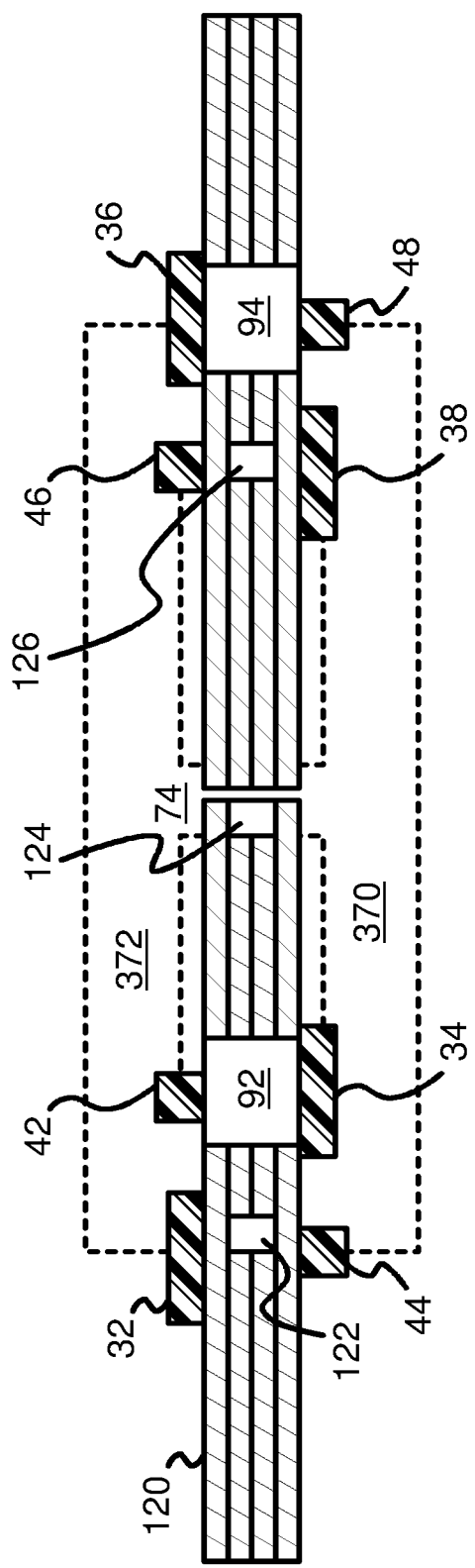
FIG. 9 is an idealized side view of the low-core-loss five-pillar transformer of FIG. 8.

FIG. 9 is an idealized side view of the low-core-loss five-pillar transformer of FIG. 8. PCB 120 has four metal layers that are separated by insulating layers. The patterns of the four metal layers are shown in FIG. 8. PCB 120 is placed between upper magnetic plate 372 and lower magnetic metal plate 370. Pillar 74 in the center, pillars 70, 76 on the left, and pillars 72, 78 on the right. Vias 122, 124, 126 connect layers 2 and 3 for the primary windings. Terminals 92, 94 fit through all four layers to carry the input and output of the primary winding. Transistors 32-38 and capacitors 42-48 are surface-mounted on top and bottom surfaces of PCB 120.

Figure 10:
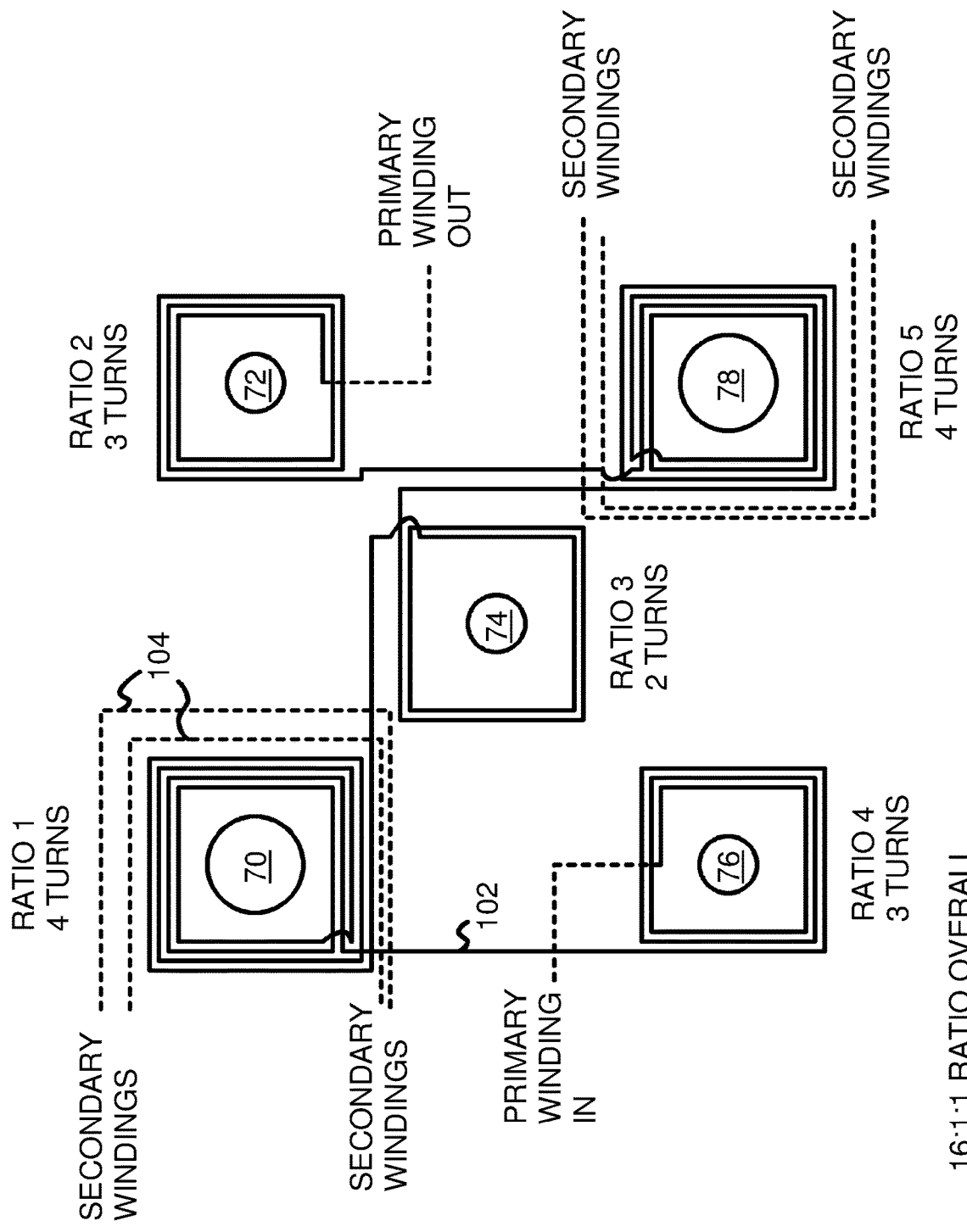
FIG. 10 is a diagram highlighting primary and secondary windings around the five pillars to produce a 16:1:1 ratio.

FIG. 10 is a diagram highlighting primary and secondary windings around the five pillars to produce a 16:1:1 ratio. In this alternative, one turn is removed from around center pillar 74, compared with FIG. 7. Primary winding 102 has a total of four turns around each of pillars 70, 78, and three turns around each of pillars 72, 76, and two turns around center pillar 74 for a total of 16 turns. Since the secondary windings are for one turn each, a turn ratio of 16:1:1 is achieved using the arrangement of FIG. 10.

FIG. 11 is a modification to the metal traces to achieve an even turn ratio. In this alternative, one turn is removed from around center pillar 74, compared with FIG. 8. The metal trace on layer 3 circles center pillar 74 for only one complete turn, rather than one-and-a-half turns. Likewise on layer 2 the trace is cut by one-half of a turn to just one turn. The total turns around center pillar 74 is reduced to two.

Primary winding 102 has a total of four turns around each of pillars 70, 78, and three turns around each of pillars 72, 76, and two turns around center pillar 74 for a total of 16 turns. Since the secondary windings are for one turn each, a turn ratio of 16:1:1 is achieved using the metal PCB traces of FIG. 11.

FIGS. 12A-12F show alternatives for the arrangement of the five pillars in the transformer. These arrangements feature a flexible core design with symmetrical pillar arrays and a low flux density enhancement by dividing the magnetic flux into several loops in the core. Magnetic metal plates 370, 372 can be identical in shape and size, but only magnetic metal plate 370 is shown in these Figures. In FIG. 12A, magnetic metal plates 370 and 372 (not shown) are circular rather than square. The PCB could also be rounded and be larger than magnetic metal plate 370 and extend out from magnetic metal plate 370. In FIG. 12B, magnetic metal plate 370 has a rectangular shape rather than a square shape. In FIG. 12C, magnetic metal plate 370 has a parallelogram or diamond shape. Upper-left pillar 70 is not directly lined up with lower-left pillar 76.

In FIG. 12D, magnetic metal plates 370, 372 extend out past pillars 70, 72, 76, 78. In FIG. 12E, magnetic metal plates 370, 372 extend out past pillars 70, 72, 76, 78 only in the x direction, not in the y direction.

The primary windings are wound around flux-receiving pillars 72, 74, 76 in a clockwise direction, but are wound around flux-emitting pillars 70, 78 in a counter-clockwise direction.

In FIG. 12F, there are additional center pillars 73, 75. Primary winding 102 wraps in a clockwise direction for all five of flux-receiving pillars 72-76 and in a counter-clockwise direction for flux-emitting pillars 70, 78. Secondary windings are wound around flux-emitting pillars 70, 78 only. With this specific N-track method, primary winding 102 can wrap around pillars 70, 76, 75, 74, 73, 72, 78 in series, in that sequence or in other sequences, such as 70, 72, 73, 74, 75, 76, 78.

This winding method of connecting each pillar in a series formed like an inverted letter "N" is referred to as N track. N track is capable of using many kinds of pillar arrays, including an odd or even number of pillars.

Figures 13, 14:
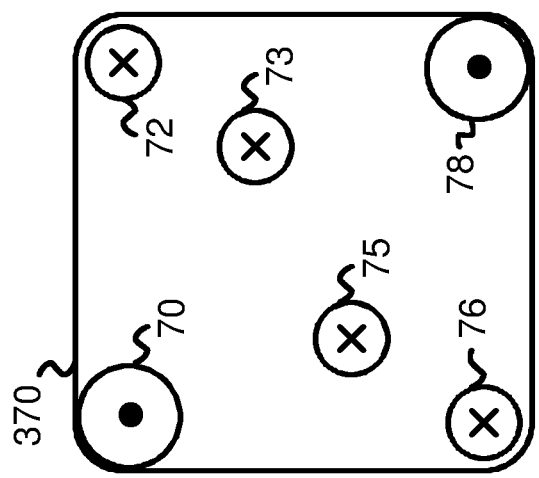
FIG. 13 is another variation for the arrangement of pillars in the transformer.
FIG. 14 is a transformer winding-turns versus input-voltage table.

FIG. 13 is another variation for the arrangement of pillars in the transformer. In this variation, the center pillar is replaced by two center pillars 73, 75 that are offset from the exact center position. Flux is balanced by this offset arrangement because the magnetic loops are symmetrical. There are eight magnetic flux loops from flux-emitting pillars 70, 78 to flux-receiving pillars 72, 73, 75, 76. The primary winding can wrap around pillar 70 counter-clockwise, then pillars 76, 75, 73, 72 clockwise in that order, and finally around pillar 78 counter-clockwise.

ALTERNATE EMBODIMENTS

Several other embodiments are contemplated by the inventors. For example more than four metal layers could be used for the PCB, and the PCB could have various shapes and modifications. While transistors and capacitors have been shown as being mounted on PCB, they could be formed within the PCB, or could be located on another board or location. AC loss and leakage inductance that exist at the connection between the secondary windings and the synchronous rectifiers can be reduced by integrating the transistors and capacitors on the PCB. While a single capacitor 42-48 per secondary winding has been shown in FIG. 3, multiple capacitors could be used in parallel. Likewise multiple transistors or diodes could be arranged in parallel for each single transistor 32-38 in FIG. 3.

The pillars could all be the same size (cross-sectional area), or could have different sizes. In one embodiment, the total area of the flux-emitting pillars 70, 78 is equal to the total area of the flux-receiving pillars 72, 74, 76, so that the magnetic flux density in each pillar is about the same. For example, each of pillars 70, 78 could have an area that is 50% larger than the area of any of pillars 72, 74, 76, or a 3:2 area ratio between flux-emitting and flux-receiving pillars. Also, center pillar 74 could be larger than corner pillars 72, 76.

The center pillar 74 and pillars 72, 76 provide three flux paths from flux-emitting pillar 70. The center pillar also provides an additional thermal path and also realizes an efficient core utilization to fill a square core geometry. So thermal conduction and distribution are improved in the magnetic core compared with only four corner pillars case. AC termination losses and DC wiring losses are all reduced. Total losses can be reduced by 10-20%.

Furthermore, with the fifth pillar at the central area of the core, the flux from a flux-emitting pillar can be divided to three paths to the flux-receiving pillars, so there are a total of six loops in the core. The flux density and core loss can be effectively reduced. For example, there is an inductance comparison between the invented five pillars and only four corner pillars cores. Although the total area of the five pillars is the same as the four corner pillars, a higher inductance is obtained due to an additional central magnetic path in the five-pillar core, which is almost 1.3 times the inductance of the four-pillar core. The magnetic resistance is indeed reduced with the five-pillar transformer, and a more even flux distribution is achieved.

Having the fifth pillar at the center of the core, the winding ratio of the transformer can be either odd or even ratios to satisfy all kinds of designed primary-side and secondary-side voltages without causing any magnetic flux unbalance and saturation issues.

Odd ratios such as 17:1:1 are useful for converting 400 volts to 12 volts, while even ratios such as 16:1:1 are useful for converting 380 volts to 12 volts. The exact voltages may differ somewhat, such as 408 volts and 384 volts. The reflected voltages can be corrected to exact values by common control methods such as Pulse Width Modulation (PWM) or Pulse Frequency Modulation (PFM) in converter regulators.

FIG. 14 is a transformer winding-turns versus input-voltage table. FIG. 14 shows input voltages required to generate a 12-volt output for various turns ratios. The number of turns for each of pillars 70-78 are shown in the table. The central pillar has fewer windings than the four corner pillars, which produces a more uniform magnetic field distribution and faster heat dissipating ability in the transformer. Other variations for different input voltage, output voltage, and pillars are possible.

Output current capability is increased by having four secondary windings 52, 54, 56, 58. Since the secondary current is distributed over two pairs of secondary windings, current density and heat-related failures can be reduced. A high-efficiency and high-power density power converter can be fitted into a small form factor, such as for power bricks and point-of-load (POL) applications.

While cylindrical pillars have been described, the pillars could have other shapes, such as hexagonal prisms, and could be irregular. The thickness of magnetic metal plates 370, 372 could be increased to reduce losses. Various materials may be used, such as ferrite core or metallic powder cores in pillars 70-78 and in magnetic metal plates 370, 372. Magnetic metal plates 370, 372 could have the same shape, or could differ in size or shape. Additional features could be added to better control the magnetic flux or to reduce magnetic core losses. Magnetic metal plates 370, 372 could be substantially but not exactly parallel to each other, or magnetic metal plates 370, 372 could be mounted at an angle to each other. Magnetic metal plates 370, 372 may not be flat or planar but may have bent or curved shapes or complex features. Then a bisecting plane through a center of mass of magnetic metal plate 370 can be substantially parallel with that for magnetic metal plate 372.

The wrapping sequence and order may be modified in various ways, such as starting and ending at other pillars. More than two additional center pillars 73, 75 may be added, in various arrangements. The center pillars may be merged into a larger pillar.

The primary windings can be routed in an N-track sequence. The N-track method connects each pillar in series to form an "N" or inverted "N". The N-track sequence can be used to connect pillar arrays regardless of the number of total pillars, and for both an odd or even number of pillars. The winding of the secondary side can also have multiple turns in different layers on the specific flux-emitting pillars. The secondary windings can be arranged in parallel for a full-wave synchronous rectifier, or in series for a full-bridge rectifier. A full-bridge rectifier can use only three PCB metal layers including one layer for the secondary winding and two layers for the primary winding, and only two secondary windings 52, 56 with one turn in series to produce a 17:2 ratio or a 16:2 ratio. The series secondary winding may be connected to a bridge rectifier with four diodes to achieve a high VOUT application. The secondary windings may be arranged in a series connection or may have more than one turn per secondary winding in parallel.

The source and drain on transistors may be reversed, and also may change with current direction changes. The terms source and drains are herein used interchangeably rather than the more cumbersome term source/drain. Standard MOS transistors such as p-channel or n-channel transistors may be used, or more specialized transistors such as GaN devices may be substituted. Various modifications to the transistors and other devices may be made for high-power and high-frequency uses.

Currents can be positive or negative currents and flow in either direction. Additional discrete or parasitic devices or components may be present, such as parasitic inductances. Additional devices may be added, such as transistors or switches to disconnect the primary or secondary windings, or to prevent overloads. Various control signals with various timings and operating modes may be applied to the gates of transistors or switches to better control operation of the power converter circuit of FIG. 3.

While patterned metal traces on a PCB have been shown, these are examples and approximate, and actual metal patterns may differ. Wider gaps in the metal layers may be used.

While the terms flux-emitting and flux-receiving have been used to describe pillars that emit or receive magnetic flux into upper magnetic metal plate 372, the magnetic flux forms a loop, so each pillar simultaneously emits flux into one of magnetic metal plates 370, 372 and receives flux from the other one of magnetic metal plates 370, 372. Thus the terms flux-emitting and flux-receiving depend on the point or reference and could be interchanged by referencing lower magnetic metal plate 370 rather than magnetic metal plate 372. The primary winding direction and the secondary winding direction, clockwise or counter-clockwise, determines the direction of the magnetic flux in a pillar according to the right hand grip rule.

The terms up, down, top, bottom, left, right, above, below are relative and used to explain relative positions. The invention can be rotated, flipped, inverted, mirrored, or otherwise transformed, and these terms can be transformed as well for the new orientation. The terms wrap or wrapped do not imply physical wrapping, such as wrapping a wire around a post, but are intended to refer to both physical wires and to PCB metal traces formed in a spiral pattern around a pillar.

Currents can be positive or negative currents and flow in either direction. Many second and third order circuit effects may be present and may be significant, especially for smaller device sizes. A circuit simulation may be used to account for these secondary factors during design.

Auxiliary windings may be present in some embodiments, and some embodiments may have more sets of windings, or in different polarities and configurations. For example, the transformer described herein has a four-layer PCB structure for the windings, in which permits flexibly adjusting the turn ratio can be implemented by either extending the PCB layers or by increasing the number of primary and secondary spiral turns per layer.

Different transistor, capacitor, resistor, and other device sizes can be used, and various layout arrangements can be used, such as multi-leg, ring, doughnut or irregular-shape transistors. Additional taps, guard rings, transistors, and other components may be added.

More complex logic and control trees could be added, such as to add disabling transistors to disable operation, such as for power-down modes. Filters could be added to various nodes, including the primary or secondary sides, such as by adding capacitors, resistors, inductors, or networks of resistors, capacitors and inductors. Leaker resistors could be added. Parasitic capacitances and resistances may be present. Hysteresis could be added for more complex waveform shaping. Buffers could be added between stages, or more stages or dummy stages could be added.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A low-core-loss transformer comprising:
   an upper magnetic metal plate;
   a lower magnetic metal plate that is parallel to the upper magnetic metal plate;
   a plurality of pillars made from a magnetic metal, the plurality of pillars situated between the upper magnetic metal plate and the lower magnetic metal plate;
   a first flux-emitting pillar in the plurality of pillars, located in a first corner position;
   a first flux-receiving pillar in the plurality of pillars, located in a second corner position;
   a second flux-emitting pillar in the plurality of pillars, located in a third corner position;
   a second flux-receiving pillar in the plurality of pillars, located in a fourth corner position;
   a center flux-receiving pillar in the plurality of pillars, located in a center position;
   wherein the center position is located halfway along a line between the first corner position and the third corner position;
   wherein the center position is located halfway along a line between the second corner position and the fourth corner position;
   a primary winding that is wrapped multiple times around each of the flux-receiving pillars in a clockwise direction, and that is wrapped multiple times around each of the flux-emitting pillars in a counter-clockwise direction;
   a first secondary winding that is wrapped around the first flux-emitting pillar; and
   a third secondary winding that is wrapped around the second flux-emitting pillar.

2. The low-core-loss transformer of claim 1 further comprising:
   a second secondary winding that is wrapped once around the first flux-emitting pillar;
   a fourth secondary winding that is wrapped once around the second flux-emitting pillar;
   wherein the first and third secondary windings are each wrapped for one turn;
   a printed-circuit board (PCB) having metal layers that are patterned to form metal traces, the metal traces on the PCB forming the primary winding;
   wherein the PCB is situated between the upper magnetic metal plate and the lower magnetic metal plate;
   wherein the plurality of pillars are fitted through holes in the PCB.

3. The low-core-loss transformer of claim 2 wherein the PCB has exactly four metal layers, wherein the primary winding is routed on two of the four metal layers, and wherein the first and third secondary windings are formed on a first of the four metal layers, and wherein the second and fourth secondary windings are formed on a fourth of the four metal layers,
   wherein the first and fourth metal layers are near surfaces of the PCB while the primary winding is routed on two of the four metal layers that are interior metal layers between the first and fourth metal layers.

4. The low-core-loss transformer of claim 3 wherein the first, second, third, and fourth secondary winding are each incompletely wrapped around a flux-emitting pillar, wherein a cutout is formed on each of the first, second, third, and fourth secondary winding, the cutout having a cutout metal node separated from the secondary winding by a first gap and by a second gap;

further comprising for each of the first, second, third, and fourth secondary windings:

a transistor, mounted to be coupled across the first gap; and a capacitor, mounted to be coupled across the second gap, wherein the transistor and capacitor are part of a synchronous rectifier operated when current is induced into the secondary windings by the transformer.

5. The low-core-loss transformer of claim 2 wherein the first, second, third, and fourth corner positions form a parallelogram with the center position being in a center of the parallelogram.

6. The low-core-loss transformer of claim 5 wherein the upper and lower magnetic metal plates extend past the first, second, third, and fourth corner positions.

7. The low-core-loss transformer of claim 2 wherein each flux-emitting pillar has a cross-sectional area that is at least 50% larger than the cross-sectional area of each of the flux-receiving pillars.

8. The low-core-loss transformer of claim 2 wherein the primary winding is wrapped in a sequence around the second flux-receiving pillar, then around the first flux-emitting pillar, then around the center flux-receiving pillar, then around the second flux-emitting pillar, and finally around the first flux-receiving pillar.

9. The low-core-loss transformer of claim 2 wherein the primary winding is wrapped around the first flux-emitting pillar for four turns, around the second flux-emitting pillar for four turns, around the first flux-receiving pillar for three turns, around the second flux-receiving pillar for three turns, and around the center flux-receiving pillar for three turns;

wherein the primary winding has a total of seventeen turns and only one turn per secondary winding, for a turn ratio of 17:1.

10. The low-core-loss transformer of claim 2 wherein the primary winding is wrapped around the first flux-emitting pillar for four turns, around the second flux-emitting pillar for four turns, around the first flux-receiving pillar for three turns, around the second flux-receiving pillar for three turns, and around the center flux-receiving pillar for two turns;

wherein the primary winding has a total of sixteen turns and only one turn per secondary winding, for a turn ratio of 16:1.

11. A low-core-loss five-pillar magnetic core comprising:

a top magnetic metal plate for conducting a magnetic flux;

a bottom magnetic metal plate for conducting the magnetic flux;

an upper-left magnetic metal pillar for conducting the magnetic flux from the bottom magnetic metal plate into the top magnetic metal plate;

an upper-right magnetic metal pillar for conducting the magnetic flux from the top magnetic metal plate into the bottom magnetic metal plate;

a central magnetic metal pillar for conducting the magnetic flux from the top magnetic metal plate into the bottom magnetic metal plate;

a lower-left magnetic metal pillar for conducting the magnetic flux from the top magnetic metal plate into the bottom magnetic metal plate;

a lower-right magnetic metal pillar for conducting the magnetic flux from the bottom magnetic metal plate into the top magnetic metal plate;

wherein the central magnetic metal pillar is located between the top and bottom magnetic metal plates and in a center position between the upper-left magnetic metal pillar, the upper-right magnetic metal pillar, the lower-left magnetic metal pillar, the lower-right magnetic metal pillar;

wherein an average of distances from the central magnetic metal pillar to the upper-left magnetic metal pillar, the upper-right magnetic metal pillar, the lower-left magnetic metal pillar, and the lower-right magnetic metal pillar is less than an average of distances between adjacent magnetic metal pillars of the upper-left magnetic metal pillar, the upper-right magnetic metal pillar, the lower-left magnetic metal pillar, and the lower-right magnetic metal pillar;

a primary winding having multiple turns around each of the upper-left magnetic metal pillar, the upper-right magnetic metal pillar, the lower-left magnetic metal pillar, the lower-right magnetic metal pillar, and the central magnetic metal pillar, the primary winding connecting the multiple turns in series between a primary input and a primary output and carrying a primary current that creates magnetic flux in the upper-left magnetic metal pillar, the upper-right magnetic metal pillar, the lower-left magnetic metal pillar, the lower-right magnetic metal pillar, and the central magnetic metal pillar;

a first secondary winding wrapped around the upper-left magnetic metal pillar;

a third secondary winding wrapped around the lower-right magnetic metal pillar, wherein a first secondary current and a third secondary current are simultaneously induced by magnetic flux flows in the upper-left magnetic metal pillar and the lower-right magnetic metal pillar;

a second secondary winding wrapped around the upper-left magnetic metal pillar; and a fourth secondary winding wrapped around the lower-right magnetic metal pillar, wherein a second secondary current and a fourth secondary current are simultaneously induced by magnetic flux flows in the upper-left magnetic metal pillar and the lower-right magnetic metal pillars.

12. The low-core-loss five-pillar magnetic core of claim 11 wherein the primary winding is wrapped in a clockwise direction when viewed from the top magnetic metal plate around each of the central magnetic metal pillar, the upper-right magnetic metal pillar, and the lower-left magnetic metal pillar;

wherein the primary winding is wrapped in a counter-clockwise direction when viewed from the top magnetic metal plate around each of the upper-left magnetic metal pillar and the lower-right magnetic metal pillar.

13. The low-core-loss five-pillar magnetic core of claim 12 further comprising:

a printed-circuit board (PCB) disposed between the top and bottom magnetic metal plates and around the upper-left magnetic metal pillar, the upper-right magnetic metal pillar, the lower-left magnetic metal pillar, the lower-right magnetic metal pillar, and the central magnetic metal pillar, the PCB having metal traces to form the primary winding, and to form the first, second, third, and fourth secondary windings.

14. The low-core-loss five-pillar magnetic core of claim 13 further comprising:

transistors and capacitors mounted on the PCB and connected to the first, second, third, and fourth secondary windings, wherein the transistors and capacitors rectify the first, second, third, and fourth secondary currents.

15. The low-core-loss five-pillar magnetic core of claim 14 wherein the primary winding is routed in a sequence around the lower-left magnetic metal pillar, the upper-left magnetic metal pillar, the central magnetic metal pillar, the lower-right magnetic metal pillar, and the upper-right magnetic metal pillar, in that order.

16. The low-core-loss five-pillar magnetic core of claim 14 wherein the primary winding is routed in a sequence of three turns around the lower-left magnetic metal pillar, four turns around the upper-left magnetic metal pillar, two or three turns around the central magnetic metal pillar, four turns around the lower-right magnetic metal pillar, three turns around the upper-right magnetic metal pillar;
wherein a total of 17 turns are formed by the primary winding when three turns are formed around the central magnetic metal pillar;
wherein a total of 16 turns are formed by the primary winding when two turns are formed around the central magnetic metal pillar;
wherein the first, second, third, and fourth secondary windings each comprise no more than one turn.

17. A multi-center low-core-loss transformer comprising:
a plurality of center pillars located near a center location, the plurality of center pillars including a first center pillar and a second center pillar;
four corner pillars arranged around the plurality of center pillars;
wherein the first center pillar and the second center pillar are closer to the center location than the four corner pillars are to the center location;
a top magnetic metal plate and a bottom magnetic metal plate above and below the four corner pillars and the plurality of center pillars and connected to the four corner pillars and to the plurality of center pillars;
a first secondary winding having a single turn around a first of the four corner pillars;
a second secondary winding having a single turn around the first of the four corner pillars;
a third secondary winding having a single turn around a third of the four corner pillars;
a fourth secondary winding having a single turn around the third of the four corner pillars;
wherein the third of the four corner pillars is opposite the first of the four corner pillars and closer to the center location and closer to a second of the four corner pillars and closer to a fourth of the four corner pillars than to the first of the four corner pillars; and
a primary winding that is wrapped multiple times around the first, second, third, and fourth of the four corner pillars and is wrapped multiple times around the first and second center pillars.

18. The multi-center low-core-loss transformer of claim 17 wherein the primary winding is wrapped multiple times in a counter-clockwise direction around the first of the four corner pillars, then wrapped multiple times in a clockwise direction around the fourth of the four corner pillars, then wrapped multiple times in a clockwise direction around the first center pillar, then wrapped multiple times in a clockwise direction around the second center pillar, then wrapped multiple times in a clockwise direction around the second of the four corner pillars, then wrapped multiple times in a counter-clockwise direction around the third of the four corner pillars.

19. The multi-center low-core-loss transformer of claim 18 further comprising:
a printed-circuit board (PCB) that is situated between the top magnetic metal plate and the bottom magnetic metal plate;
two patterned metal layers in the PCB having patterned metal traces that form the primary winding; and
two surface metal layers on the PCB having patterned metal traces that form the first, second, third, and fourth secondary windings.

20. The multi-center low-core-loss transformer of claim 19 further comprising:
a capacitor and a transistor placed on the PCB for each of the first, second, third, and fourth secondary winding, the capacitor connected to a tail end of a secondary winding, the transistor connected to a head end of a secondary winding, wherein opposite terminals of the capacitor and of the transistor that are not terminals connected to the secondary winding are connected together as a secondary-side ground node.

* * * * *